United States Patent

Hartmann et al.

Patent Number: 5,599,898
Date of Patent: Feb. 4, 1997

[54] INSOLUBLE, ONLY SLIGHTLY SWELLABLE POLYMERS CONTAINING AMINO GROUPS, THEIR PREPARATION AND THEIR USE

[75] Inventors: Heinrich Hartmann, Limburgerhof; Walter Denzinger, Speyer; Michael Kroener, Mannheim; Claudia Nilz, Roedersheim-Gronau, all of Germany

[73] Assignee: BASF Aktiengesellschaft, Ludwigshafen, Germany

[21] Appl. No.: 325,187

[22] PCT Filed: Oct. 29, 1993

[86] PCT No.: PCT/EP93/03019

§ 371 Date: Apr. 25, 1995

§ 102(e) Date: Apr. 25, 1995

[87] PCT Pub. No.: WO94/11408

PCT Pub. Date: May 26, 1994

[30] Foreign Application Priority Data

Nov. 6, 1992 [DE] Germany ............... 42 37 439.1

[51] Int. Cl.$^6$ ............... C08G 69/08; C08G 73/10
[52] U.S. Cl. ............... 528/310; 528/315; 528/317; 528/319; 528/340; 528/345; 521/25; 521/31; 521/32; 521/38; 526/303.1; 526/307.1; 526/307.2
[58] Field of Search ............... 528/310, 315, 528/317, 319, 340, 345; 521/25, 31, 32, 38; 526/303.1, 307.1, 307.2

[56] References Cited

U.S. PATENT DOCUMENTS

| | | | |
|---|---|---|---|
| 3,277,066 | 10/1966 | Grosser et al. | |
| 4,451,582 | 5/1984 | Denzinger et al. | |
| 4,647,637 | 3/1987 | Tschang et al. | 526/264 |
| 4,658,002 | 4/1987 | Tschang et al. | 526/264 |

Primary Examiner—James J. Seidleck
Assistant Examiner—Duc Truong
Attorney, Agent, or Firm—Oblon, Spivak, McClelland, Maier & Neustadt, P.C.

[57] ABSTRACT

Abstract of the Disclosure: Insoluble, only slightly swellable polymers containing amino groups, which can be obtained from popcorn polymers containing units of the structure

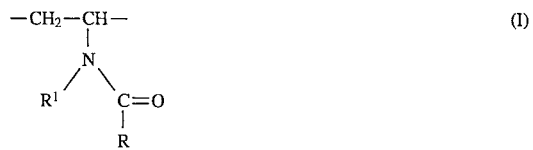

where R and R$^1$ are H or C$_1$–C$_4$-alkyl, by eliminating the group R—CO— from at least 2% of the incorporated units of the structure I, with the formation of units of the structure II

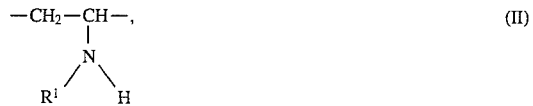

a process for the preparation of the amino-containing popcorn polymers by polymerizing N-vinylcarboxamides and, if desired, other monoethylenically unsaturated monomers copolymerizable therewith with from 0.1 to 10% by weight, based on the monomers used in the polymerization, of a compound containing at least two ethylenically unsaturated non-conjugated double bonds as crosslinking agent, with exclusion of oxygen and polymerization initiators, to form popcorn polymers, and elimination of formyl groups from at least 2% of the copolymerized N-vinylcarboxamides, and the use of the resulting insoluble, only slightly swellable polymers containing amino groups as ion exchangers or adsorber resins for metal ions are described.

32 Claims, No Drawings

INSOLUBLE, ONLY SLIGHTLY SWELLABLE POLYMERS CONTAINING AMINO GROUPS, THEIR PREPARATION AND THEIR USE

This application is a 371 of Pct/EP 93/03019 filed Oct. 29, 1993.

The present invention relates to insoluble, only slightly swellable polymers containing amino groups, to a process for their preparation by popcorn polymerization of open-chain N-vinylcarboxamides and hydrolysis of the copolymerized N-vinylcarboxamides to vinylamine units, and also to the use of the hydrolyzed popcorn polymers as ion exchangers.

DE-C-2,255,263 describes a process for preparing insoluble, crosslinked and only slightly swellable polymers of N-vinylpyrrolidone, in which N-vinylpyrrolidone is polymerized in aqueous solution in the presence of from 0.5 to 10% by weight, based on N-vinylpyrrolidone, of a cyclic acid amide that contains at least two ethylenicallyunsaturated groups, at least one of which is bound to the amide nitrogen atom, as crosslinking agent. The polymerization reaction is started by heating the reaction solution to at least 80° C. and is continued to completion at the boiling point of water.

US-A-3,277,066 relates to a process for preparing insoluble polymers of N-vinyllactams by heating N-vinyllactams in the presence of oxides and hydroxides of alkali metals or alkaline earth metals as catalysts, and water. The polymerization is started at elevated temperatures, for example at 140° C., and is then continued at a lower temperature (100° C.).

US-A-4,451,582 describes a process for preparing insoluble, only slightly water-swellable, granular polymers from basic vinyl heterocyclics having a pKa of greater than 4 and their copolymers having up to 30% by weight of copolymerizable monomers, in which the monomers are polymerized in the presence of from 0.1 to 10% by weight, based on the total amount of monomers, of a crosslinking agent with exclusion of oxygen and polymerization initiators. The polymers are preferably prepared by precipitation polymerization in water. However, they can also be obtained in the absence of solvents for the monomers by heating the monomers at preferably 150° to 180° C. This reaction is however difficult to control and produces only low space-time yields and relatively highly contaminated products.

EP-A-0,088,964 describes a process for preparing insoluble, only slightly water-swellable, granular polymers wherein monomers of a basic vinyl heterocycle, such as vinylimidazole, vinylpyridines or N-vinyllactams, are polymerized in the presence of from 0.1 to 10% by weight, based on the total amount of monomers, of a crosslinking agent with exclusion of oxygen and polymerization initiators. The polymers obtainable in this way are used, for example, as ion exchangers or for the adsorptive immobilization of enzymes.

It is also known to prepare insoluble, only slightly swellable polymers of acrylic acid, known as popcorn polymers, by polymerizing acrylic acid in aqueous solution in the presence of small amounts of 2,2'-azobisisobutyronitrile, cf. J. W. Breitenbach et al., Makromol. Chemie 177, (1976), pp 2787 to 2792. However, polymer mixtures are obtained that contain as principal constituent a glassy polymer (gel) and minor amounts of popcorn polymers of acrylic acid. It is not technically possible to separate the polymer mixtures without substantial effort and expenditure.

It is known from Houben-Weyl, Vol. 14, Makrom. Stoffe, Part 1 (1961), p. 98, that popcorn polymers are formed from mixtures of styrene and divinylbenzene. Such polymers are also formed in the industrial polymerization of butadiene and styrene. Methyl acrylate also tends to form popcorn polymers. Popcorn polymers have the property that, on contact with the monomers of which they are composed or with other monomers, they can convert these into popcorn polymers. They act, as it were, as a nucleus for the polymerization. However, the activity is lost if they come into contact with air.

It is known from Ullmanns Encyklopädie der Techn. Chemie, 4th Edition, Vol. 19, 1980, p. 385, that an insoluble polymer only slightly swellable in water is formed in a spontaneous reaction on heating N-vinylpyrrolidone with hydroxides and alcoholates of alkali metals and alkaline earth metals. Substances termed popcorn polymers are also formed on heating N-vinylpyrrolidone with divinyl compounds with exclusion of oxygen. In the absence of bases the reaction generally takes several hours before the popcorn polymerization begins at all.

EP-B-0,071,050 and EP-A-0,216,387 disclose water-soluble homopolymers and copolymers that contain vinylamine units incorporated by polymerization.

EP-B-0,177,812 describes a process for preparing insoluble, only slightly swellable, pulverulent polymers based on monoethylenically unsaturated carboxylic acid amides, carboxylic acids and carboxylic acid esters, in which an active popcorn polymer is used to start the polymerization, which can be obtained by heating a mixture of from 99.6 to 99.8% by weight of N-vinyl-2-pyrrolidone and from 0.4 to 1.2% by weight of a compound having at least two ethylenically unsaturated double bonds as crosslinking agent at from 100° to 150° C. in the absence of oxygen and polymerization initiators. As soon as the active popcorn polymer is formed, a mixture of (a) from 99.9 to 90% by weight of at least one compound from the group of N-vinylcarboxamides, acrylamide, methacrylamide, acrylic acid, methacrylic acid, acrylic acid esters, methacrylic acid esters and/or vinyl esters and (b) from 0.1 to 10% by weight, based on the total monomers, of a compound having at least two ethylenicallyunsaturated, non-conjugated double bonds, as crosslinking agent, is polymerized therein in a powder bed in the presence of a heat transfer agent that is inert with respect to the reactants, at from 90° to 220° C. while maintaining the pulverulent state, with circulation of the reaction mixture and evaporation of the heat transfer agent from the polymerization zone with exclusion of oxygen and polymerization initiators.

These popcorn polymers are used for example to absorb tannins from beverages and as ion exchangers. Carboxyl-containing popcorn polymers can also be obtained by saponifying polymers containing acrylic ester units and acrylamide units.

It is an object of the present invention to provide novel substances that can be used as ion exchangers containing amino groups.

We have found that this object is achieved by insoluble, only slightly swellable polymers containing amino groups, which can be obtained from popcorn polymers that contain units of the structure

where R and R$^1$ are H or C$_1$–C$_4$-alkyl, by eliminating the group

from at least 2% of the incorporated units of the structure I, with the formation of units of the structure where $R^1$ is H or $C_1$–$C_4$-alkyl.

The present invention also provides a process for preparing insoluble, only slightly swellable polymers containing amino groups, wherein (a) N-vinylcarboxamides of the formula

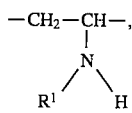

where R and $R^1$ are H or $C_1$–$C_4$-alkyl, and if desired (b) other monoethylenically unsaturated monomers copolymerizable therewith are polymerized with (c) from 0.1 to 10% by weight, based on the monomers (a) and (b) used in the polymerization, of a compound containing at least two ethylenically unsaturated double bonds as crosslinking agent, with exclusion of oxygen and polymerization initiators to form popcorn polymers, and the group

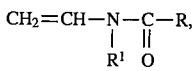

is eliminated from at least 2% of the copolymerized N-vinylcarboxamides of the formula III by the action of enzymes, acids or bases.

The resulting insoluble, only slightly swellable polymers containing amino groups are used as ion exchangers or adsorber resins for metal ions.

The polymers according to the invention are prepared by a two-stage process. In the first stage popcorn polymers are prepared by known methods and are then treated in the second stage with enzymes, acids or bases and are thereby converted into amino-containing popcorn polymers. As component (a) for the preparation of the known popcorn polymers, N-vinylcarboxamides of the

formula

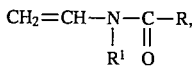

are used, where R and $R^1$ are H or $C_1$–$C_4$ alkyl.

Suitable compounds of the formula III are for example N-vinylformamide, N-vinyl-N-methylformamide, N-vinylacetamide, N-vinyl-N-methylacetamide, N-vinyl-N-ethylformamide, N-vinyl-N-n-propylformamide, N-vinyl-N-isopropylformamide, N-vinyl-N-isobutylformamide, N-vinyl-N-methylpropionamide, N-vinyl-n-butylacetamide and N-vinyl-N-methylpropionamide. From this group of monomers, preference is given to N-vinylformamide.

Monomers of the group (b) which, if desired, are co-used in the preparation of the popcorn polymers are other monoethylenically unsaturated monomers copolymerizable with the monomers of the groups (a) and (c).

Monomers of the group (b) include for example acrylamide, methacrylamide, acrylic acid, methacrylic acid, acrylic acid esters, methacrylic acid esters and/or vinyl esters. The acrylic acid esters and methacrylic acid esters are preferably derived from saturated, monohydric alcohols having 1 to 4 carbon atoms or saturated dihydric alcohols having 2 to 4 carbon atoms. Examples of such esters are methyl acrylate, methyl methacrylate, ethyl acrylate, ethyl methacrylate, n-propyl acrylate, n-propyl methacrylate, isopropyl acrylate, isopropyl methacrylate, and esters of acrylic acid and methacrylic acid that are derived from isomeric butanols, and also hydroxyethyl acrylate, hydroxyethyl methacrylate, hydroxypropyl acrylate, hydroxypropyl methacrylate, hydroxybutyl acrylate, hydroxyisobutyl acrylate and hydroxyisobutyl methacrylate. Preferred vinyl esters are vinyl acetate and vinyl propionate. Further suitable monomers of the group (b) include acrylonitrile, methacrylonitrile, N-vinylpyrrolidone, N-vinylcaprolactam, 1-vinylimidazole, 2-methyl-1-vinylimidazole and 4-methyl-1-vinylimidazole. The monomers of the group (b) may be polymerized alone or also mixed with one another, together with the monomers of the groups (a) and (c). Of the monomers of the group (b), particular preference is given to N-vinylpyrrolidone for the preparation of popcorn polymers. The popcorn polymerization can be started for example by heating N-vinylpyrrolidone and small amounts, for example from 0.4 to 1.2% by weight, of a crosslinking agent such as N,N'-divinylethyleneurea, in aqueous medium in the presence of alkali. The popcorn polymerization is preferably started using freshly distilled N-vinyl-2-pyrrolidone. The popcorn polymerization is performed particularly easily with N-vinylpyrrolidone at from about 100° to 150° C. in the absence of oxygen and polymerization initiators.

The monomers of the group (b) are, if co-used in the preparation of popcorn polymers, present in an amount of from 0.1 to 80% by weight in the monomer mixture of (a) and (b).

Monomers of the group (c) that are used as crosslinking agents in the polymerisation are compounds that contain at least two ethylenically unsaturated non-conjugated double bonds in the molecule. Particularly suitable are for example alkylenebisacrylamides such as methylenebisacrylamide and N,N'-acryloylethylenediamine, N,N'-divinylethyleneurea, N,N'-divinylpropyleneurea, ethylidenebis-3-(N-vinylpyrrolidone), N,N'-divinyl-2,2'-diimidazolylbutane and 1,1'-bis(3,3'-vinylbenzimidazolid-2-one)1,4-butane. Other suitable crosslinking agents are for example alkylene glycol di(meth) acrylates such as ethylene glycol diacrylate, ethylene glycol dimethacrylate, tetraethylene glycol acrylate, tetraethylene glycol dimethacrylate, diethylene glycol acrylate, diethylene glycol methacrylate, aromatic divinyl compounds such as divinylbenzene and divinyltoluene, and also vinyl acrylate, allyl acrylate, allyl methacrylate, divinyldioxane, pentaerythritol triallyl ether, and also mixtures of the crosslinking agents. The crosslinking agents are used in amounts of from 0.1 to 10% by weight, preferably from 1 to 4% by weight, based on the monomers (a) and (b) used in the polymerization.

The popcorn polymerization is carried out according to known methods, for example as precipitation polymerization or by bulk polymerization. In a preferred procedure, which is described in EP-B-0,177,812, the popcorn polymerization is started by heating a mixture of from 99.6 to 98.8% by weight of N-vinylpyrrolidone and from 0.4 to 1.2% by weight of a compound having at least two ethylenically unsaturated double bonds as crosslinking agent to from 100° to 150° C. in the absence of oxygen and polymerization initiators. This polymerization is initiated in particular by the presence of small amounts of sodium hydroxide or potassium hydroxide. A polymerizable popcorn polymer is formed within a short time, which on addition of suitable other monomer mixtures, ie. of the monomers of the group (a) and if necessary (b) and further addition of the monomers (c), starts the popcorn polymerization of these monomers without any induction period.

In order to carry out the popcorn polymerization without solvents, the monomer mixture of (a) and (c) and also if desired (b) is rendered inert by passing in nitrogen and is then heated to from 100° to 200° C., preferably from 150° to 180° C. It is advantageous to continue to pass a gentle stream of nitrogen through the monomers even during the polymerization. Oxygen is also excluded by polymerizing the batch at the reduced pressure at which the monomers boil. Depending on the nature of the monomers employed and the chosen temperature, the mixture polymerizes within 1 to 20 hours. For example, in the polymerization of N-vinylamides with 2% of N,N'-divinylethyleneurea at 150° C. while stirring with a powerful stirrer and under a pressure of 310 mbar, the first polymer particles form after 2.5 hours, the amount of particles increasing slowly until, after 10 hours polymerization, the reaction mixture consists of a powder. The popcorn polymer is obtained in yields of greater than 90% in the form of a powder having an average particle size of about 10 µm to 5 mm, preferably from 10 µm to 500 µm.

Precipitation polymerization in water is preferred for the preparation of the popcorn polymers. The concentration of the monomers is expediently chosen so that the reaction mixture can easily be stirred throughout the whole duration of the reaction. If the concentration of the monomers in water is too high, for example 95%, the polymer grains become sticky, with the result that stirring becomes more difficult than in the absence of water. In order to carry out the reaction in conventional stirred vessels, the monomer concentration is chosen to be from about 5 to 30% by weight, preferably from 10 to 20 % by weight, based on the aqueous mixture. If fairly powerful stirrers are available, the monomer concentration of the aqueous solution can also be increased to 50% by weight, if necessary even above. In some cases it may be expedient to start the popcorn polymerization with a relatively concentrated solution and then to add water for dilution during the course of the reaction. The popcorn polymerization is preferably carried out at a pH of above 6, in order to prevent any possible saponification of the monomers (b) and/or (c). The pH can be adjusted by adding small amounts of bases such as sodium hydroxide or ammonia or the conventional buffer salts such as sodium carbonate, sodium hydrogen carbonate or sodium phosphate. Exclusion of oxygen can best be achieved by heating the mixture to be polymerized at the boil and if necessary additionally working in an inert gas atmosphere, for example by passing nitrogen through the reaction mixture. The polymerization temperature may be varied in a wide range, for example from about 20° to 200° C., preferably from 50° to 150° C.

In some cases it may also be advantageous to add small µmounts—from 0.1 to 1% by weight, based on the monomer mixture—of a reducing agent such as sodium sulfite, sodium pyrosulfite, sodium dithionite, ascorbic acid or mixtures of reducing agents in order completely to remove dissolved oxygen.

In a particularly preferred embodiment of precipitation polymerization the water-soluble comonomer (preferably an N-vinyllactam such as N-vinylpyrrolidone), some of the crosslinking agent, water, and if desired a buffer and a reducing agent are heated in a gentle stream of nitrogen until the first polymer particles become visible. A mixture of an N-vinylamide, preferably N-vinylformamide, and the remainder of the crosslinking agent and if necessary water, previously rendered inert by blowing in nitrogen, are then added as diluent within 0.2 to 2 hours. This procedure has the advantage that the popcorn polymerization takes only a short time. The popcorn polymers can be separated from the aqueous solution, purified, and then hydrolyzed. It is however also possible to hydrolyze the aqueous suspension of the popcorn polymers directly. The popcorn polymers are normally obtained in a yield of from about 90% to >99% of the theoretical yield, and can be separated from the aqueous suspension by filtration or centrifugation, followed by washing with water and drying in conventional dryers such as circulating-air or vacuum drying cabinets, paddle dryers or pneumatic dryers. The popcorn polymers are practically insoluble in water and all solvents and also swell only slightly therein.

The novel insoluble, only slightly swellable polymers containing amino groups are hydrolyzed in the second stage of the preparation process, the group R—CO— being eliminated from at least 2% of the copolymerized units of the structure I, with the formation of units of the structure II.

The hydrolyric cleavage of the carboxamide functions I contained in the popcorn polymers proceeds unexpectedly smoothly. A chemically and physically crosslinked polymer should, on account of its insolubility in solvents, also be attacked only very slightly, if at all, by solvolysis reagents. In fact however depending on the reaction conditions, ie. the amount of hydrolysis agent and also the reaction time and temperature, either a partial or complete hydrolysis of the amide functions I is achieved very readily. The hydrolysis of the popcorn polymers is continued until from 2 to 100%, preferably from 20 to 90% of the N-vinylcarboxamide units I contained in the polymers are hydrolyzed. The hydrolysis agents used are preferably acids or bases.

Suitable acids are for example mineral acids such as hydrogen halide (gaseous or in aqueous solution), sulfuric acid, nitric acid, phosphoric acid (ortho-, meta- or polyphosphoric acid) and organic acids, for example $C_1$–$C_5$-carboxylic acids such as formic acid, acetic acid or propionic acid, or aliphatic or aromatic sulfonic acids such as methanesulfonic acid, benzene-sulfonic acid or toluenesulfonic acid. The hydrolysis is preferably carried out using hydrochloric acid or sulfuric acid. In the hydrolysis with the acids the pH is from 0 to 5. Normally from 0.05 to 2.0 equivalents, preferably from 0.4 to 1.2 equivalents of acid are required per formyl group equivalent in the polymer.

In the case of hydrolysis with bases hydroxides of metals of the first and second main groups of the Periodic Table can be used, suitable bases being for example lithium hydroxide, sodium hydroxide, potassium hydroxide, magnesium hydroxide, calcium hydroxide, strontium hydroxide and barium hydroxide. Also suitable are carbonates, for example sodium carbonate, potassium carbonate, magnesium carbonate, calcium carbonate, strontium carbonate and barium carbonate. However, ammonia and alkyl derivatives of ammonia may also be used, for example alkylamines or arylamines, for example triethylamine, monoethanolamine, diethanolamine, triethanolamine, morpholine or aniline. For hydrolysis with bases the pH is from 8 to 14. The bases may be used diluted or undiluted in the solid, liquid or, if desired, also in the gaseous state, preferred bases for the hydrolysis being ammonia, sodium hydroxide or potassium hydroxide.

The elimination of the groups

from the copolymerized units of the structure I can also be carried out using enzymes. Suitable enzymes are for example proteases, amidases and ureases.

The enzymes are preferably used in amounts of from 0.1 to 20% by weight, based on the amount of copolymerizable amide structures.

The elimination of the groups

from the popcorn polymers containing units of the structure I is preferably carried out in aqueous suspension with a solids content of from 0.1 to 50% by weight, preferably from 1 to 20% by weight. A particularly preferred procedure is one in which, for the hydrolysis, the bases or acids are added in aqueous solution. The hydrolysis in the acid or alkaline pH range is carried out at from 30° to 170° C., preferably from 50° to 110° C. It is advisable to stir the suspension vigorously in order to prevent agglomeration. The reaction time is from 1 to 30 hours, preferably from 6 to 20 hours.

The degree of hydrolysis is determined by quantitative analysis of the carboxylic acid, in particular formic acid, released in the reaction.

After acid hydrolysis the popcorn polymers containing amine functions are generally present in the form of salts, suitable counterions being the corresponding acid anions or anions of the released carboxylic acids, for example formate. In order to obtain partly or completely free amines, the polymers are deprotonated in aqueous suspension by adding bases. Suitable bases are in particular alkali metal and alkaline earth metal hydroxides, in particular sodium hydroxide, alkali metal and alkaline earth metal carbonates, in particular sodium carbonate, ammonia, and alkyl derivatives of ammonia. The salts formed in the neutralization, for example sodium chloride, remain in aqueous solution. After basic hydrolysis, the popcorn polymers containing amine functions exist as free bases. In order partly or completely to obtain the salt form from the latter, the hydrolyzed popcorn polymers are protonated in aqueous suspension with acids. Suitable acids are for example mineral acids, preferably hydrochloric acid, organic acids, for example $C_1$–$C_5$-carboxylic acids, or aliphatic or aromatic sulfonic acids.

The hydrolyzed popcorn polymers, which contain primary or secondary amino groups, may if desired be quaternized, using conventional quaternization agents, such as alkyl halides, for example methyl chloride, ethyl chloride, dodecyl chloride or benzyl chloride, or dialkyl sulfates such as dimethyl sulfate or diethyl sulfate.

The popcorn polymers containing copolymerized vinylamine units can be separated from the aqueous suspension by filtration or centrifugation, followed by washing with water and drying in conventional dryers such as circulating air or vacuum drying cabinets, blade dryers or pneumatic dryers.

Insoluble, amino-containing popcorn polymers are suitable for removing metal ions from solutions in all types of solvents. However, the process is preferably applied to aqueous solutions of metal ions, for example alkali metal and alkaline earth metal ions, in particular heavy metal ions, eg. $Cu^{2+}$, $Fe^{2+}$, $Ni^{2+}$ and $Zn^{2+}$. The anions of the metal salts have virtually no influence on the removability of the metal ions from solutions.

The amount of amino-containing hydrolyzed popcorn polymers is chosen so that the number of moles of available amino groups is at least equivalent to the number of metal ions in the solution. An excess of amino groups is preferably employed. From 2 to 100 mol%, preferably more than 50 mol%, of the amine function should be present as free base for substantial complexation of the metal ions. An expedient procedure is to add to a metal salt solution a hydrolyzed popcorn polymer containing the corresponding amount of free amino groups. It is however also possible to suspend such popcorn polymers in salt form in the metal salt solution and increase the pH of the solution by adding bases, for example sodium hydroxide or ammonia, and thereby to deprotonate the ammonium groups in the hydrolyzed popcorn polymer. A noticeable complexing is observed in the case of $Cu^{2+}$ already at a pH above 3.

The complexing ability of the amino group-containing popcorn polymers is determined by quantitative analysis of the metal ions remaining in solution. Suitable analysis methods include for example complexometric titration or atomic absorption spectroscopy, and if necessary also spectrophotometry.

EXAMPLES

Example 1

450 g of distilled water, 50 g of N-vinylpyrrolidone, 1 g of N,N'-divinylethyleneurea and 0.05 g of sodium hydroxide are heated to 60° C. in a stirred apparatus while passing in a gentle stream of nitrogen. 0.1 g of sodium dithionite dissolved in 10 g of distilled water is now added. The mixture is heated to 60° C. and maintained at this temperature. White flakes form after 20 minutes. A solution of 3 g of N,N -divinylethyleneurea in 150 g of N-vinylformamide is now uniformly metered in within 20 minutes. The white flakes transform into a polymer suspension, which slowly becomes extremely viscous. The batch is diluted with 1000 ml of distilled water within 2 hours so that it can still be stirred. The batch is next heated for a further hour at 60° C. and then cooled. The viscous suspension is now filtered off and washed with water (about 2000 ml) in order to remove impurities such as soluble polymer and monomers. The moist product has a solids content of 40.3%; the yield of popcorn polymer is 96%.

Hydrolyzed Popcorn Polymer 1

100 g of the moist popcorn polymer described above are suspended in 650 g of water in a stirred flask and 48 g of 38% strength hydrochloric acid solution are added. The suspension is heated for 15 hours at 80° C. while stirring vigorously. The degree of hydrolysis is monitored by enzymatic analysis of the released formic acid. After the end of the reaction the batch is cooled to room temperature, and the solids are filtered by suction, washed copiously with water, and dried in a vacuum drying cabinet at 70° C. 50 g of white solid product is obtained having a solids content of 83%. The degree of hydrolysis of the copolymerized N-vinylformamide units is 78%.

Hydrolyzed Popcorn Polymer 2

100 g of the moist, not yet hydrolyzed popcorn polymer prepared according to Example 1 are suspended in 650 g of water in a stirred flask and 40 g of a 50% strength sodium hydroxide solution is added. The suspension is heated at 80° C. for 15 hours while stirring vigorously. The degree of hydrolysis is monitored by enzymatic analysis of the released formate. After cooling the suspension to room temperature, the solids are filtered by suction, washed copiously with water, and dried in a vacuum drying cabinet at 70° C. 33 g of a white basic product are obtained having a solids content of 91%. The degree of hydrolysis of the copolymerized vinylformamide units is 82%.

Example 2

800 g of distilled water, 180 g of N-vinylformamide, 20 g of N-vinylpyrrolidone, 4 g of N,N'-divinylethyleneurea and 0.05 g of sodium hydroxide are heated to 60° C. in a stirred apparatus while passing in a gentle stream of nitrogen. 0.4 g of sodium dithionite dissolved in 10 g of distilled water is now added all at once and the temperature is maintained at 60° C. Fine flakes form after 15 minutes, which after 4 hours yield a thick paste of polymer particles in water. The paste is now heated for a further 3 hours at 60° C., cooled, filtered, and washed with water. The solids content of the product is 41.2%. The yield of popcorn polymer is 97.8%.

Hydrolyzed Popcorn Polymer 3

100 g of the moist popcorn polymer described above are suspended in 650 g of water in a stirred flask and 60 g of a 38% strength hydrochloric acid solution are added. The suspension is heated at 90° C. for 12 hours while stirring vigorously. The batch is then cooled, and the solid material is filtered by suction and washed copiously with water. After drying in a vacuum drying cabinet at 70° C., 50 g of polymer are obtained having a degree of hydrolysis of the copolymerized N-vinylformamide units of 79% and a solids content of 95%.

EXAMPLE 3

960 g of distilled water, 0.1 g of sodium hydroxide, 40 g of N-vinylpyrrolidone and 0.8 g of N,N'-divinylethyleneurea are heated at 60° C. in a stirred apparatus while passing in nitrogen. 0.2 g of sodium dithionite is now added. The temperature of the reaction mixture is maintained at 60° C. After about 30 minutes individual white flakes are discernible in the batch. A solution of 7.2 g of N,N'-divinylethyleneurea in 360 g of N-vinylformamide are now uniformly metered in within 30 minutes, the amount of flakes continuing to increase. The mixture is maintained at 60° C. for 3 hours and is then diluted with 2500 g of distilled water on account of the increase in viscosity of the polymer suspension. After cooling the suspension to room temperature, the polymer is filtered off and washed with about 5 l of water. The solids content of the polymer particles is 28%. The yield of popcorn polymer is 99.4%.

Hydrolyzed Popcorn Polymer 4

100 g of the moist popcorn polymer described above are suspended in 650 g of water in a stirred flask and 30 g of a 70% strength sulfuric acid solution are added. The suspension is heated at 80° C. for 10 hours while stirring vigorously. After the suspension has cooled to room temperature the solid substance is filtered by suction and washed with water until sulfate can no longer be detected in the wash water. After drying in a vacuum drying cabinet, 36 g of popcorn polymer is obtained with a degree of hydrolysis of 95% of the copolymerized N-vinylformamide groups and a solids content of 96%.

APPLICATION EXAMPLES

Complexing of $Cu^{2+}$ 2.2 g of finely comminuted hydrolyzed popcorn polymer 4 (=22.0 mmol of protonated amine function) are added to 150 ml of a 0.02 molar copper sulfate solution (=3.0 mmol $Cu^{2+}$). After stirring for 15 minutes at room temperature the pH is adjusted to 5 by adding dropwise 5 g of a 7% strength sodium hydroxide solution (=8.75 mmol). The solution is stirred for 1 hour at room temperature, the polymer rapidly assuming a deep-blue color. In order to analyze the remaining amount of copper in solution, ammonia is added to an aliquot of the supernatant solution, the absorbance of the blue copper tetramine complex is measured photometrically, and the corresponding amount of copper is determined from a calibration curve.

The depletion of the $Cu^{2+}$ ions in the solution is 97 mol%.

Complexing of $Ni^{2+}$ 2.2 g of finely comminuted hydrolyzed popcorn polymer 4 (=22.0 mmol of protonated amine function) are added to 150 ml of a 0.02 molar nickel sulfate solution (=3.0 mmol $Ni^{2+}$). After stirring for 15 minutes at room temperature, the pH is adjusted to 7 by adding dropwise 6 g of a 7% strength sodium hydroxide solution (=10.5 mmol). The mixture is stirred for 1 hour at room temperature and the amount of $Ni^{2+}$ remaining in solution is measured by complexometric titration.

The depletion is 62 mol%.

Complexing of $Zn^{2+}$ 2.2 g of finely comminuted hydrolyzed popcorn polymer 4 (=22.0 mmol of protonated amine function) are added to 150 ml of a 0.02 molar zinc sulfate solution (=3.0 mmol $Zn^{2+}$). After stirring for 15 minutes at room temperature the pH is adjusted to 7 by adding dropwise 6 g of a 7% strength sodium hydroxide solution (=10.5 mmol). The mixture is stirred for 1 hour at room temperature and the amount of $Zn^{2+}$ remaining in solution is measured by complexometric titration.

The depletion is 48 mol%.

We claim:

1. An insoluble, only slightly swellable polymer containing amino groups, wherein said polymer comprises popcorn polymers containing units of the formula (I):

wherein R and $R^1$ are H or $C_1$–$C_4$-alkyl, and wherein at least 2% of the units of the formula (I) are replaced with units of the formula (II):

wherein $R^1$ is H or $C_1$–$C_4$-alkyl.

2. The insoluble, only slightly swellable polymer of claim 1, wherein said $C_1$–$C_4$ alkyl for R and $R^1$ is selected from the group consisting of methyl, ethyl, n-propyl, isopropyl, n-butyl and isobutyl.

3. The insoluble, only slightly swellable polymer of claim 1, wherein both of said R and $R^1$ are hydrogen.

4. The insoluble, only slightly swellable polymer of claim 1, wherein from about 20 to 90% of the units of the formula (I) are replaced with units of the formula (II).

5. The insoluble, only slightly swellable polymer of claim 1, which is in the form of a powder having an average particle size of about 10 μm to 5 mm.

6. The insoluble, only slightly swellable polymer of claim 5, having an average particle size of about 10 μm to 500 μm.

7. A process for preparing insoluble, only slightly swellable polymers containing amino groups therein, which comprises:

a) reacting:
i) N-vinylcarboxamides of the formula (III):

$$CH_2=CH-\underset{R^1}{N}-\underset{O}{\overset{\|}{C}}-R \qquad (III)$$

wherein R and $R^1$ are H or $C_1$–$C_4$ alkyl, and, optionally,
(ii) other monoethylenically unsaturated monomers copolymerizable therewith, in the presence of
(iii) from 0.1 to 10% by weight, based on the monomers a) and b) used in the polymerization, of a compound containing at least two ethylenically unsaturated double bonds as a cross-linking agent, with the exclusion of oxygen and in the presence of polymerization initiators to form popcorn polymers; and b) eliminating at least 2% of the group:

$$\underset{O}{\overset{\|}{\underset{}{R-C-}}}$$

of the co-polymerized N-vinylcarboxamides by hydrolyzing the same in the presence of acids, bases or enzymes.

8. The process of claim 7, wherein the monomer a) is selected from the group consisting of N-vinylformamide, N-vinyl-N-methylformamide, N-vinylacetamide, N-vinyl-N-methyl acetamide, N-vinyl-N-ethylformamide, N-vinyl-N-n-propylformamide, N-vinyl-N-isopropylformamide, N-vinyl-N-isobutylformamide, N-vinyl-N-methylpropionamide, N-vinyl-n-butylacetamide and N-vinyl-N-methylpropionamide.

9. The process of claim 8, wherein said monomer a) is N-vinylformamide.

10. The process of claim 7, wherein said other monoethylenically unsaturated monomers (ii) are selected from the group consisting of acrylamide, methacrylamide, acrylic acid, methacrylic acid, acrylic acid esters, methacrylic acid esters, vinyl esters, acrylonitrile, methacrylonitrile, N-vinylpyrrolidone, N-vinylcaprolactam, 1-vinylimidazole, 2-methyl-1-vinylimidazole and 4-methyl-1-vinylimidazole.

11. The process of claim 10, wherein said acrylic acid esters are selected from the group consisting of methyl acrylate, ethyl acrylate, n-propyl acrylate, isopropyl acrylate, hydroxyethyl acrylate, hydroxypropyl acrylate, hydroxybutyl acrylate and hydroxyisobutyl acrylate.

12. The process of claim 10, wherein said methacrylic acid esters are selected from the group consisting of methyl methacrylate, ethyl methacrylate, n-propyl methacrylate, isopropyl methacrylate, hydroxyethyl methacrylate, hydroxypropyl methacrylate and hydroxyisobutyl methacrylate.

13. The process of claim 10, wherein said other monethylenically unsaturated monomer (ii) is N-vinylpyrrolidone.

14. The process of claim 7, wherein said other monoethylenically unsaturated monomer (ii) is used in an amount of from 0.1 to 80% by weight based upon the weight of the mixture of the N-vinylcarboxamides (i) and the monomer (ii).

15. The process of claim 7, wherein cross-linking agent (iii) is selected from the group consisting of alkylenebisacrylamides, alkylene glycol di(meth) acrylates, aromatic divinyl compounds, vinyl acrylate, allyl acrylate, allyl methacrylate, divinyldioxane and pentaerythritol triallyl ether.

16. The process of claim 15, wherein said alkylenebisacrylamides are selected from the group consisting of methylenebisacrylamide, N,N'-acryloyl ethylenediamine, N,N'-divinylethyleneurea, N,N'-divinylpropylene urea, ethylidenebis-3-(N-vinylpyrrolidone), N,N'-divinyl-2,2'-diimidazolylbutane and 1,1'bis (3,3'-vinylbenzimidazolid-2-one) 1,4-butane.

17. The process of claim 7, wherein said cross-linking agent is used in an amount of from 1 to 4% by weight, based on the monomers (i) and (ii) used.

18. The process of claim 7, which comprises reacting said N-vinylcarboxamides (i) and said cross-linking agent (iii) at from 100° C. to 150° C. in the absence of oxygen and in the presence of an amount of sodium hydroxide or potassium hydroxide sufficient to initiate polymerization.

19. The process of claim 7, wherein said reacting is effected in water, using a total monomer weight based upon the aqueous mixture.

20. The process of claim 19, wherein a total monomer weight of from 10 to 20% by weight is used.

21. The process of claim 19, which is effected at a pH of above 6 in order to prevent saponification of monomers (ii) or (iii) or both.

22. The process of claim 7, wherein said reacting is effected in a temperature range of about 20° to 200° C.

23. The process of claim 7, wherein said hydrolyzing step (b) is effected in the presence of an acid, which is a acid or an organic acid, at a pH of from 0 to 5.

24. The process of claim 23, wherein a mineral acid is used, which is selected from the group consisting of sulfuric acid and hydrochloric acid.

25. The process of claim 7, wherein said hydrolyzing step (b) is effected in the presence of a base, which is a hydroxide or carbonate of metals of the first and second main groups of the Periodic Table, ammonia or alkylated ammonia, at a pH of from 8 to 14.

26. The process of claim 25, wherein said hydrolyzing step (b) is effected with ammonia, sodium hydroxide or potassium hydroxide.

27. The process of claim 7, wherein said hydrolyzing step (b) is effected at a temperature of from 30° C. to 170° C.

28. The process of claim 27, which is effected at a temperature of from 50° C. to 110° C.

29. The process of claim 7, wherein N-vinylformamide and N,N'-divinylethylene urea are polymerized to form popcorn polymers and the formyl group is eliminated from 2 to 100% of the N-vinyl formamide units contained therein, with the formation of primary amino groups.

30. A method of removing metal ions from a solution containing metal ions, comprising contacting a metal ion-containing solution with the polymer of claim 1.

31. The process of claim 30, wherein said metal ion-containing solution is an aqueous solution containing alkali metal ions, alkaline earth metal ions or a combination thereof.

32. The process of claim 30, wherein said metal ion-containing solution contains metal ions selected from the group consisting of $Cu^{+2}$, $Zn^{+2}$, $Fe^{+2}$ and $Ni^{+2}$.

* * * * *